(12) United States Patent
Brenner

(10) Patent No.: US 11,554,480 B2
(45) Date of Patent: Jan. 17, 2023

(54) SYSTEMS AND METHODS FOR IMPLEMENTING MINIATURIZED CYCLOIDAL GEARS

(71) Applicant: Samsung Electronics Company, Ltd., Suwon si (KR)

(72) Inventor: Thomas Brenner, Mountain View, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 0 days.

(21) Appl. No.: 17/223,965

(22) Filed: Apr. 6, 2021

(65) Prior Publication Data
US 2022/0314431 A1 Oct. 6, 2022

(51) Int. Cl.
*B25J 9/10* (2006.01)
*F16H 55/06* (2006.01)
*B33Y 80/00* (2015.01)

(52) U.S. Cl.
CPC ............ *B25J 9/102* (2013.01); *B25J 9/108* (2013.01); *F16H 55/06* (2013.01); *B33Y 80/00* (2014.12)

(58) Field of Classification Search
CPC ............ B25J 9/102; B25J 9/108; F16H 55/06
See application file for complete search history.

(56) References Cited

U.S. PATENT DOCUMENTS

| | | | | |
|---|---|---|---|---|
| 3,567,504 A | * | 3/1971 | Hopkins et al. | F16C 33/44 508/108 |
| 5,286,235 A | * | 2/1994 | Gerat | B25J 9/102 475/176 |
| 8,998,501 B2 | * | 4/2015 | Dahlman | F16C 33/64 384/492 |
| 9,476,484 B2 | | 10/2016 | Duerner | |
| 9,586,457 B2 | | 3/2017 | Jeon | |

(Continued)

FOREIGN PATENT DOCUMENTS

| | | |
|---|---|---|
| CN | 111173896 | 5/2020 |
| JP | 2007-051709 A | 3/2007 |

(Continued)

OTHER PUBLICATIONS

Thube, Sandeep V., and Todd R. Bobak. "Dynamic analysis of a cycloidal gearbox using finite element method." *AGMA Technical Paper* (2012): 1-13, Oct. 1, 2012.

(Continued)

*Primary Examiner* — Terence Boes

(57) ABSTRACT

In one embodiment, a gear system includes two cycloidal gears coupled to an eccentric drive shaft via a cartridge bearing. Each of the two cycloidal gears includes a number N of pockets on a surface of the gears to receive a ball bearing in the respective pocket. The N pockets on the surface of a first cycloidal gear of the two cycloidal gears are substantially aligned with the N pockets on the surface of a second cycloidal gear of the two cycloidal gears. Each of the two cycloidal gears further includes a lip coupled to the cartridge bearing. The gear system includes a number N of ball bearings disposed in the N pockets of the two cycloidal gears, where the ball bearings maintain a distance between the two cycloidal gears. The ball bearings cause the respective cycloidal gear to be flush with the cartridge bearing coupled to the eccentric shaft.

20 Claims, 10 Drawing Sheets

(56) References Cited

U.S. PATENT DOCUMENTS

| | | | |
|---|---|---|---|
| 10,184,547 B2 | 1/2019 | Fecko | |
| 2002/0191878 A1* | 12/2002 | Ueda | C23C 8/10 384/492 |
| 2004/0198543 A1 | 10/2004 | Christ | |
| 2016/0297500 A1 | 10/2016 | Dubose | |
| 2019/0301570 A1 | 10/2019 | Weir | |
| 2021/0031362 A1* | 2/2021 | Zhang | F16H 1/32 |

FOREIGN PATENT DOCUMENTS

| | | |
|---|---|---|
| JP | 2018-035897 | 3/2018 |
| JP | 6540184 B2 | 7/2019 |
| WO | WO 2006-034921 A1 | 4/2006 |

OTHER PUBLICATIONS

PCT Search Report in PCT/KR2022/003638, dated Jun. 16, 2022.
PCT Written Opinion in PCT/KR2022/003638, dated Jun. 16, 2022.

* cited by examiner

SYSTEMS AND METHODS FOR IMPLEMENTING MINIATURIZED CYCLOIDAL GEARS

TECHNICAL FIELD

This disclosure relates generally to gear systems, and in particular relates to cycloidal gears.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition.

Gear systems utilized in electro-mechanical systems, and particularly in robotic systems, may need to be miniaturized to fit into the systems. Robotic systems may require a miniaturized cycloidal gearbox to fit into a robotic limb.

DESCRIPTION OF EXAMPLE EMBODIMENTS

Robotic System Overview

Figure 1:
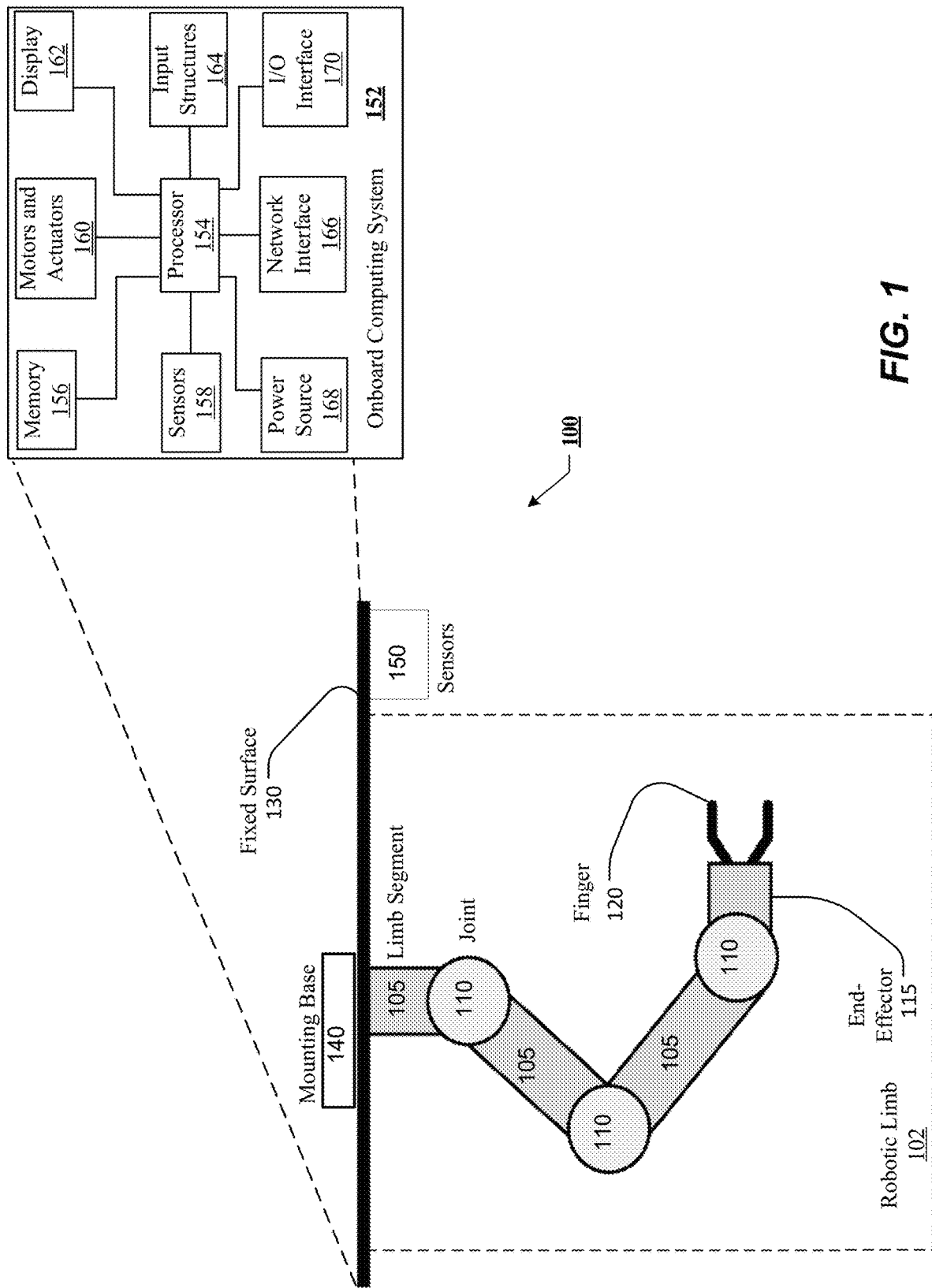
FIG. 1 illustrates an example robotic limb and apparatus.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130 via mounting base 140, which may be a low-profile mounting base. As an example and not by way of limitation, this fixed surface may include a wall, a ceiling, a cabinet, a workbench, etc. In some embodiments, robotic limb 102 may be associated with one or more external sensors 150. As an example and not by way of limitation, an external RGB camera may be mounted on the mounting base 140 to capture movement of the robotic limb 102. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb. In particular embodiments, while the onboard computing system 152 is shown separate from the robotic limb, one or more components of the onboard computing system 152 may be located within the robotic limb 102. As an example and not by way of limitation, one or more motors and actuators 160 may be enclosed in the joint 110 section of the robotic limb 102. As another example and not by way of limitation, the power source 168 may be located within the mounting base 140. In particular embodiments, one or more components of the robotic system 100 may be included in another component of the robotic system 100. As an example and not by way of limitation, while sensors 150 are shown to be separate from the robotic limb 102, sensors 150 may be included in one or more components of the robotic limb 102.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image-based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Miniaturized Cycloidal Gears

In particular embodiments, the disclosed technology includes a system for implementing miniaturized cycloidal gears. The disclosed technology includes a gear system that includes miniaturized cycloidal gears. The gear system may be used in any suitable electro-mechanical system, including, for example, robotic systems. As an example and not by way of limitation, the miniaturized cycloidal gears may be used for a gear system within a robotic system. The miniaturized cycloidal gears may be used for other systems that include a gear system. Robotic systems have gotten increasingly complex as they are utilized for various technological fields. Additionally, there is a need to reduce the size of robotic systems. This may be to implement the robotic system in a different manner. However, as the size of components of a robotic system is reduced, different components may be needed to restrict the movement of various parts. As an example and not by way of limitation, cycloidal gears may need to be limited in movement otherwise the cycloidal gears may be dislocated from its intended position. Miniaturizing cycloidal gears may also present further problems, such as removal of bearings/bushings in output drive holes which may lead to increased wear and friction in the gear system. Although this disclosure describes implementing miniaturized cycloidal gears in a particular manner, this disclosure contemplates implementing miniaturized cycloidal gears in any suitable manner.

Certain technical challenges exist for implementing miniaturized cycloidal gears. One technical challenge may include prevention in movement of the cycloidal gears. Each cycloidal gear may be fit onto a bearing which drives the cycloidal gear. However, being fit onto the bearing gives the cycloidal gear one axis on which the cycloidal gear may move and become dislocated. To address the unwanted movement, more components may be added to prevent the cycloidal gear from moving. However, the more components added may enlarge the gear system, which is counter to the intended objective of miniaturizing the gear system. The solution presented by the embodiments disclosed herein to address this challenge may be implementing two cycloidal gears in a cycloidal gearbox using captive ball bearings.

Certain embodiments disclosed herein may provide one or more technical advantages. A technical advantage of the embodiments may include the combining multiple components into one component. To further combine multiple components into one component, multi material 3D printing may be used. This combination of multiple components may further reduce the size of the whole assembly. Certain embodiments disclosed herein may provide none, some, or all of the above technical advantages. One or more other technical advantages may be readily apparent to one skilled in the art in view of the figures, descriptions, and claims of the present disclosure.

In particular embodiments, a gear system may comprise two cycloidal gears coupled to an eccentric drive shaft via a cartridge bearing. Each of the two cycloidal gears may comprise a number N of pockets on a surface of the cycloidal gears to receive a ball bearing in the respective pocket. The N pockets on the surface of a first cycloidal gear of the two cycloidal gears may be substantially aligned with the N pockets on the surface of a second cycloidal gear of the two cycloidal gears. As an example and not by way of limitation, two cycloidal gears may have seven (7) pockets each, and the seven (7) pockets on the surface of the first cycloidal gear may be aligned directly with the seven (7) pockets on the surface of the second cycloidal gear. In other words, there is a one-to-one relationship between the number of pockets on each gear. However, the alignment may fluctuate minimally when components of the gear system are in motion. In particular embodiments, each of the two cycloidal gears may include a lip coupled to the cartridge bearing. In particular embodiments, the lip may prevent the respective cycloidal gear from moving in a first dimension. As an example and not by way of limitation, the lip of the cycloidal gear may prevent the cycloidal gear from moving in a direction parallel to the eccentric drive shaft. In particular embodiments, the number N pockets may be as many as there are drive pins. In particular embodiments the number N pockets may be three or greater. In particular embodiments, the gear system may comprise a number N of ball bearings disposed in the N pockets of the two cycloidal gears. As an example and not by way of limitation, the gear system may have two cycloidal gears with five (5) pockets each, and include five (5) ball bearings to fill each pair of five (5) pockets of the cycloidal gears. In other words, there is a one-to-one relationship between the number of pockets on the cycloidal gears and the number of ball bearings. In particular embodiments, the ball bearings may maintain a specified distance between the two cycloidal gears. As an example and not by way of limitation, the ball bearings may maintain a distance of 1 mm between the two cycloidal gears. In particular embodiments, the ball bearings may cause the respective cycloidal gear to be flush with the cartridge bearing coupled to the eccentric shaft. As an example and not by way of limitation, the ball bearings may exert a force on both cycloidal gears to press the cycloidal gears against the cartridge bearing. In particular embodiments, the ball bearings may prevent relative movement between the two cycloidal gears. As an example and not by way of limitation, the ball bearings may exert a force on both cycloidal gears to prevent the cycloidal gears from moving in one or more directions. For instance, the ball bearings may exert a force on both cycloidal gears to prevent the cycloidal gears from rotating off-axis and become misaligned. In particular embodiments, the ball bearings may maintain parallelism between the cycloidal gears. The parallelism may keep the cycloidal gears perpendicular to the axis of the eccentric shaft. In particular embodiments, the ball bearings may allow the cycloidal gears to oscillate in relation to each other. Although this disclosure describes a gear system in a particular manner, this disclosure contemplates a gear system in any suitable manner.

In particular embodiments, the pockets on the surface of the cycloidal gears may be customized based on one or more factors. In particular embodiments a size of each of the pockets on the surface of the cycloidal gears may be based on one or more of a specified distance between the two cycloidal gears, an eccentricity of the two cycloidal gears, and a size of the ball bearings. In particular embodiments, the size of the ball bearings may be based on a potential load that the gear system will experience. In particular embodiments, a depth of each of the pockets may be based on a diameter of the N ball bearings and a specified distance between the two cycloidal gears. In particular embodiments, the depth of each of the pockets may be equal to the diameter of the ball bearing minus the specified distance between the two cycloidal gears divided by two. As an example and not by way of limitation, if the desired specified distance between the two cycloidal gears is X mm, and the diameter of the ball bearings is Y mm, then the depth of each pocket should be equal to (Y mm−X mm)/2=Z mm depth of each pocket. For instance, if X=2 and Y=8, then Z=3. In particular embodiments, a diameter of each of the pockets may be based on a diameter of the N ball bearings and an eccentricity of the two cycloidal gears. In particular embodiments, the diameter of each of the pockets may be equal to the diameter of the ball bearing plus two times the eccentricity of the two cycloidal gears. As an example and not by way of limitation, if the diameter of the ball bearings is Y mm, and the eccentricity is e, then the diameter of each pocket should be equal to Y mm+(e×2)=Z mm diameter of each pocket. For instance, if Y=5 and e=2, then Z=9. In particular embodiments the interior of each of the pockets may be curved. Although this disclosure describes pockets on a surface of a cycloidal gear in a particular manner, this disclosure contemplates pockets on a surface of a cycloidal gear in any suitable manner.

In particular embodiments, the ball bearings may prevent the two cycloidal gears from moving a distance in a second dimension over a predetermined distance. In particular embodiments, the first dimension may be parallel to the axis of rotation, and the second dimension may be perpendicular to the axis of rotation. The lips of the cycloidal gears may prevent the respective cycloidal gears from moving in a direction parallel to the axis of rotation. The ball bearings may prevent the two cycloidal gears from moving in a distance along a direction perpendicular to the axis of rotation that is over a predetermined distance. As an example and not by way of limitation, the ball bearings may prevent the two cycloidal gears from moving a distance over 1 mm.

In particular embodiments, the cycloidal gears may be manufactured using a multi-material metal printing process. As an example and not by way of limitation, the cycloidal gears may be manufactured using a 3D printing process that uses multiple metals. In particular embodiments, a main body of each of the cycloidal gears may be made of a first material comprising a first set of properties. As an example and not by way of limitation, the main body of each of the cycloidal gears may be made of a standard material for a gear system, such as S45C carbon steel. In particular embodiments, each of the pockets may be made of a second material comprising a second set of properties that are different from the first set of properties. As an example and not by way of limitation, the pockets may be made of an anti-friction material, such as SAE 660 bearing bronze. In particular embodiments, cycloid teeth of the cycloidal gears may be made of a third material comprising a third set of properties that are different from the first set of properties and the second set of properties. As an example and not by way of limitation, the cycloid teeth may be made of wear-resistant material, such as a wear-resistant steel, 4150 alloy steel. In particular embodiments, one or more other parts of the cycloidal gears may be made of different materials based on desired functionality of the parts. As an example and not by way of limitation, the main body of the cycloidal gears may be made of a ductile bulk material to reduce a chance of the cycloidal gear of cracking, such as 1045 carbon steel. Although this disclosure describes cycloidal gears being manufactured in a particular manner, this disclosure contemplates cycloidal gears being manufactured in any suitable manner.

In particular embodiments, the robotic system may send one or more driving commands to an eccentric drive shaft of a gear system. As an example and not by way of limitation, the robotic system may send a driving command of a certain duty cycle to the eccentric shaft of the gear system. In particular embodiments, the gear system may comprise two cycloidal gears coupled to the eccentric drive shaft via a cartridge bearing, where each of the two cycloidal gears may comprise a number N of pockets on a surface of the gears to receive a ball bearing in the respective pocket. In particular embodiments, the N pockets on the surface of a first cycloidal gear of the two cycloidal gears may be substantially aligned with the N pockets on the surface of a second cycloidal gear of the two cycloidal gears, where each of the two cycloidal gears may comprise a lip coupled to the cartridge bearing. In particular embodiments, the lip may prevent the respective cycloidal gear from moving in a first dimension. In particular embodiments, the gear system may comprise a number N of ball bearings disposed in the N pockets of the two cycloidal gears. In particular embodiments, the ball bearings may maintain a specified distance between the two cycloidal gears, where the ball bearings may cause the respective cycloidal gear to be flush with the cartridge bearing coupled to the eccentric shaft, and where the ball bearings may prevent relative movement between the two cycloidal gears. In particular embodiments, the robotic system may cause, in response to the one or more driving commands, a component coupled to the gear system to rotate. As an example and not by way of limitation, the robotic system may cause a robotic limb of the robotic system to rotate in response to the driving commands. In particular embodiments and not by way of limitation, the one or more driving commands may cause a component coupled to the gear system to move in a direction. Although this disclosure describes a robotic system operating in a particular manner, this disclosure contemplates a robotic system operating in any suitable manner.

Figure 2:
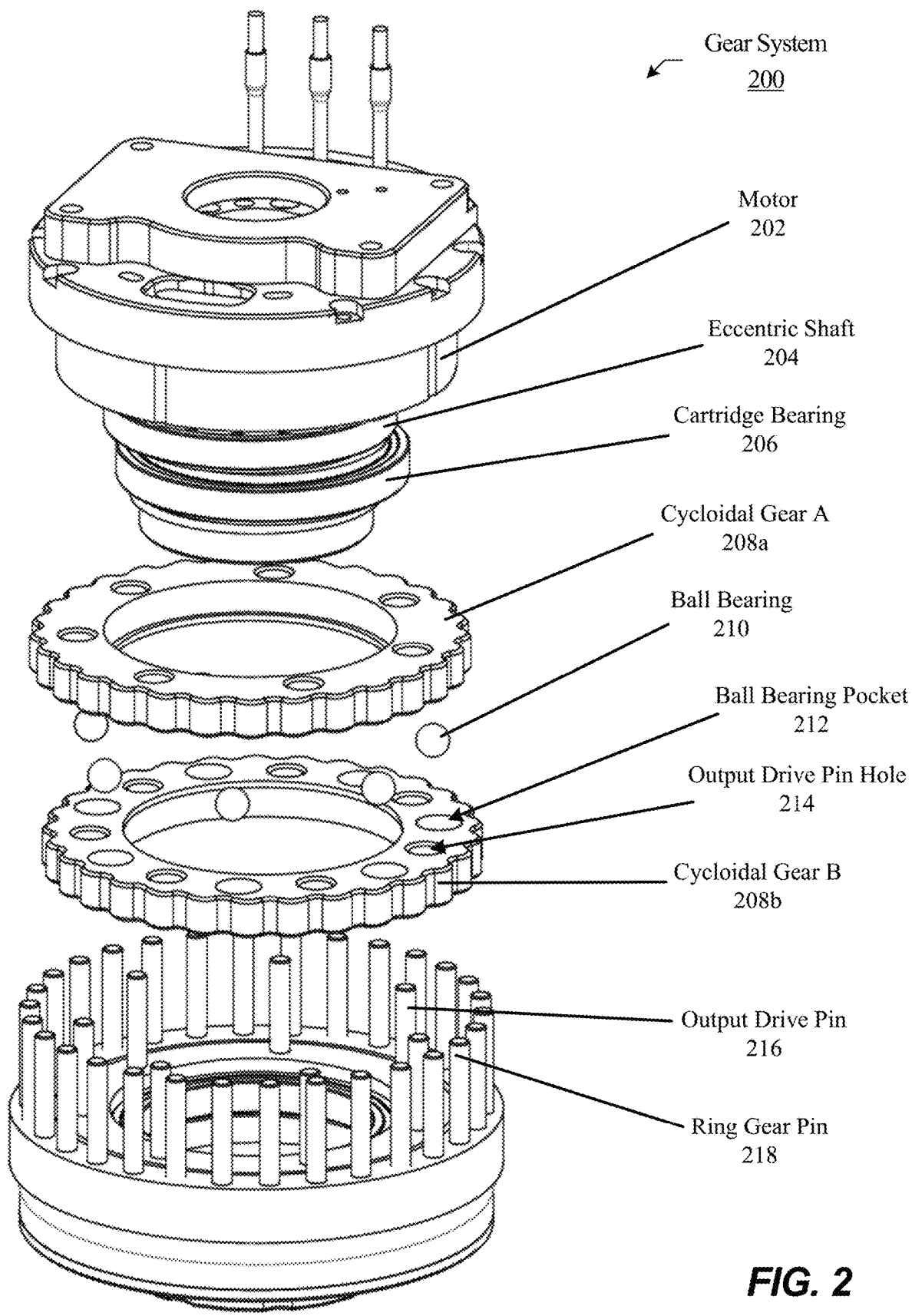
FIG. 2 illustrates an exploded view of an example gear system.

FIG. 2 illustrates an exploded view of an example gear system 200. In particular embodiments, the gear system 200 may comprise one or more of a motor 202, an eccentric shaft 204, a cartridge bearing 206, two cycloidal gears 208a-208b, a plurality of ball bearings 210, a plurality of ball bearing pockets 212, a plurality of output drive pin holes 214, a plurality of output drive pins 216, and a plurality of ring gear pins 218. While a certain number of components of the gear system 200 is shown and in a particular arrangement, this disclosure contemplates a gear system 200 with any number of components arranged in any suitable manner. As an example and not by way of limitation, the gear system may include additional ball bearings 210 and additional ball bearing pockets 212. As an example and not by way of limitation, the In particular embodiments, the gear system 200 may comprise a number N of ball bearings 210 that is equal to the number N of ball bearing pockets 212. In particular embodiments, the gear system 200 may comprise a number M of output drive pin holes 214 that correspond to the number M of output drive pins 216. In particular embodiments, the cartridge bearing 206 may be coupled to the eccentric shaft 204, which is coupled to the motor 202.

Figure 3:
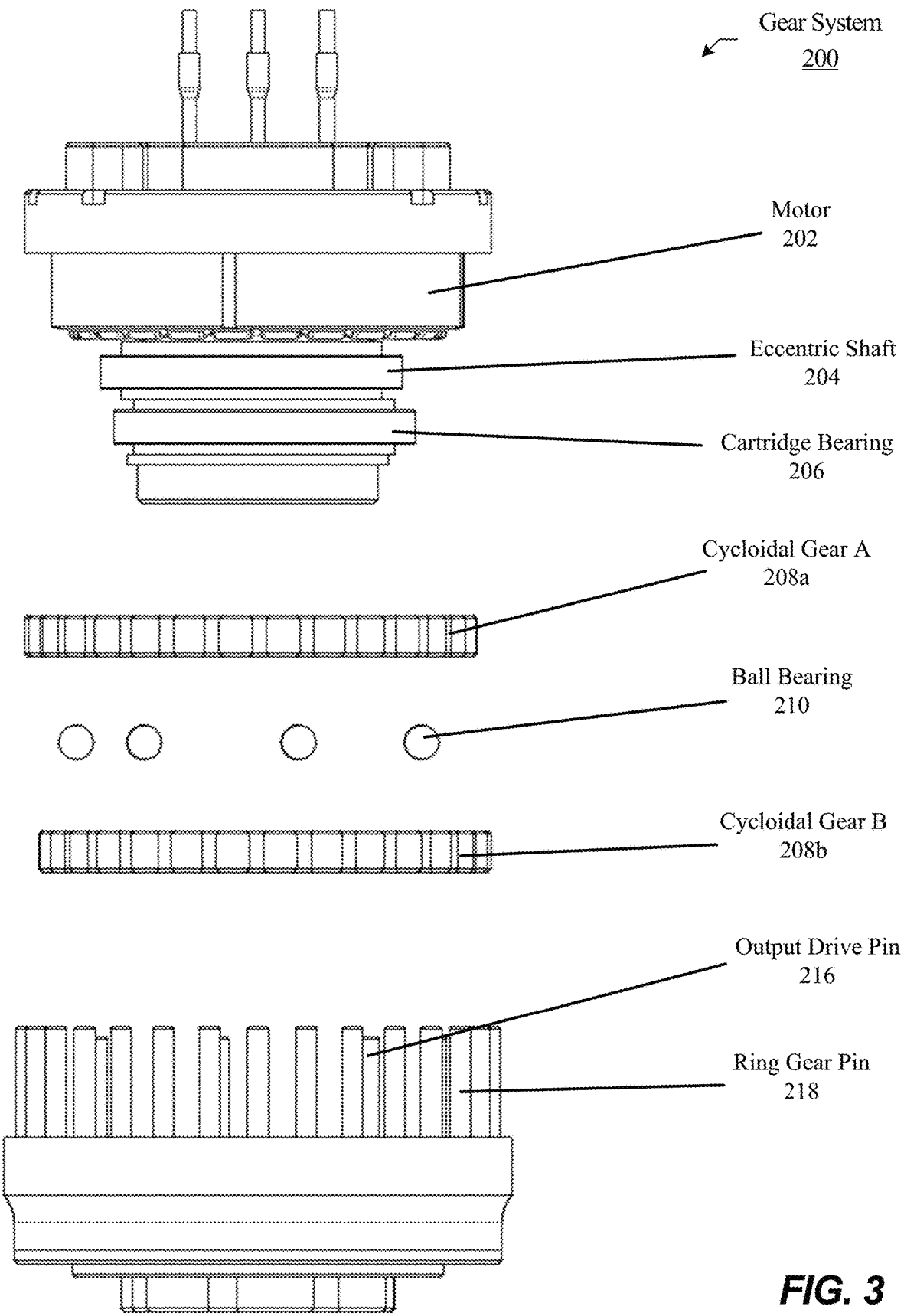
FIG. 3 illustrates a side view of an example gear system.

FIG. 3 illustrates a side view of the example gear system 200. Similarly to the gear system 200 shown in FIG. 2, the gear system 200 illustrated in FIG. 3 may comprise the same components.

Figure 4:
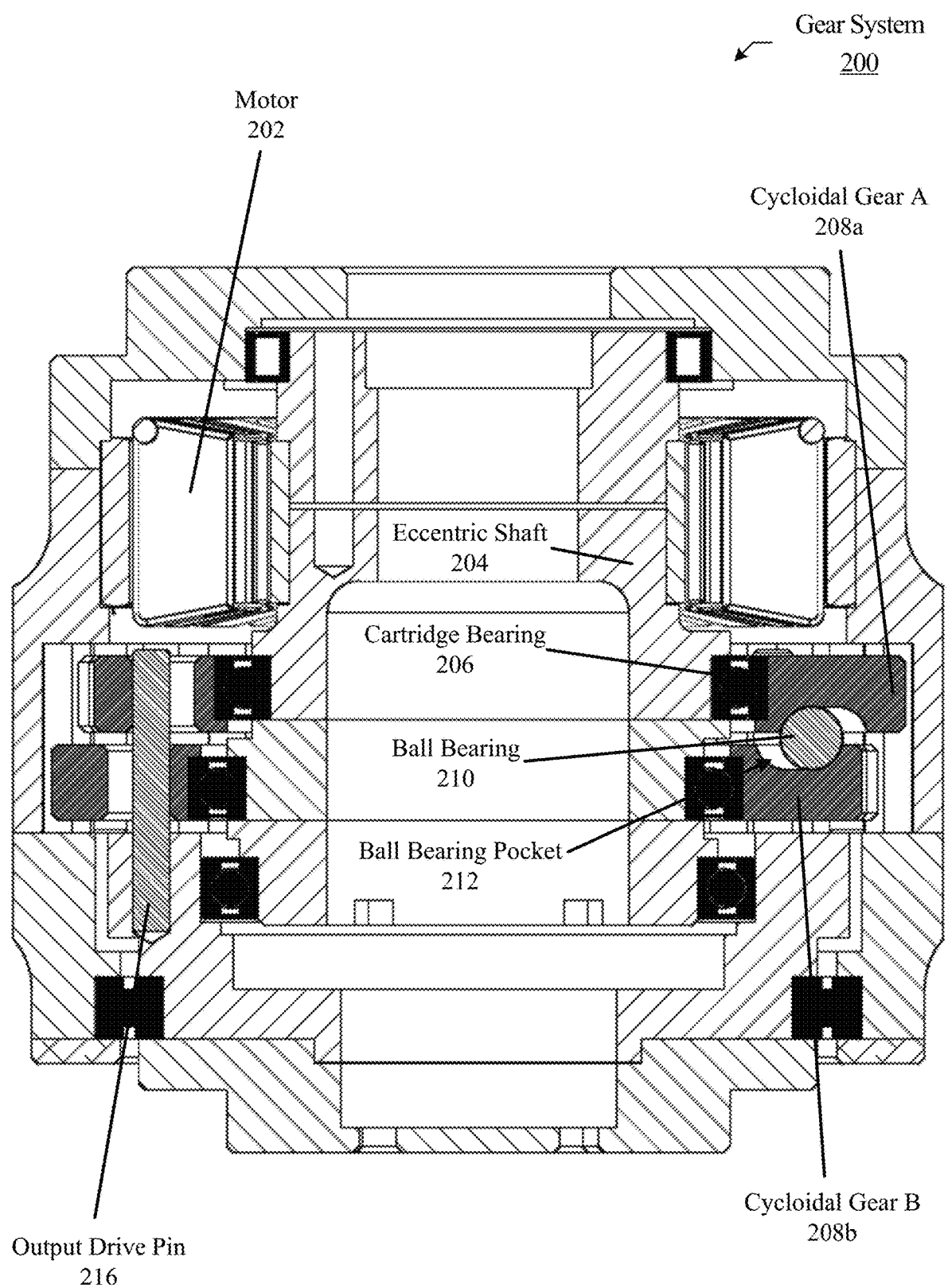
FIG. 4 illustrates a cut-out view of an example gear system.

FIG. 4 illustrates a cut-out view of an example gear system 200. In particular embodiments, the components shown in FIG. 2 may be combined to show the gear system 200 of FIG. 4. In particular embodiments, the motor 202 may be coupled to the eccentric shaft 204. In particular embodiments, the cartridge bearing 206 may be coupled to the eccentric shaft 204. In particular embodiments, the cycloidal gears 208a, 208b may each be coupled to a cartridge bearing 206. In particular embodiments, the cycloidal gears 208 may comprise a lip that couples to the cartridge bearing 206. In particular embodiments, the cycloidal gears 208 may each comprise ball bearing pockets 212 that enclose a ball bearing 210. In particular embodiments, an output drive pin hole 214 of both cycloidal gears may receive an output drive pin 216. While only a certain number of components of the gear system 200 are shown, there may be other components of the gear system 200 not shown. As an example and not by way of limitation, other ball bearings 210 may be included, but not visible in the current view of the gear system 200.

Figure 5:
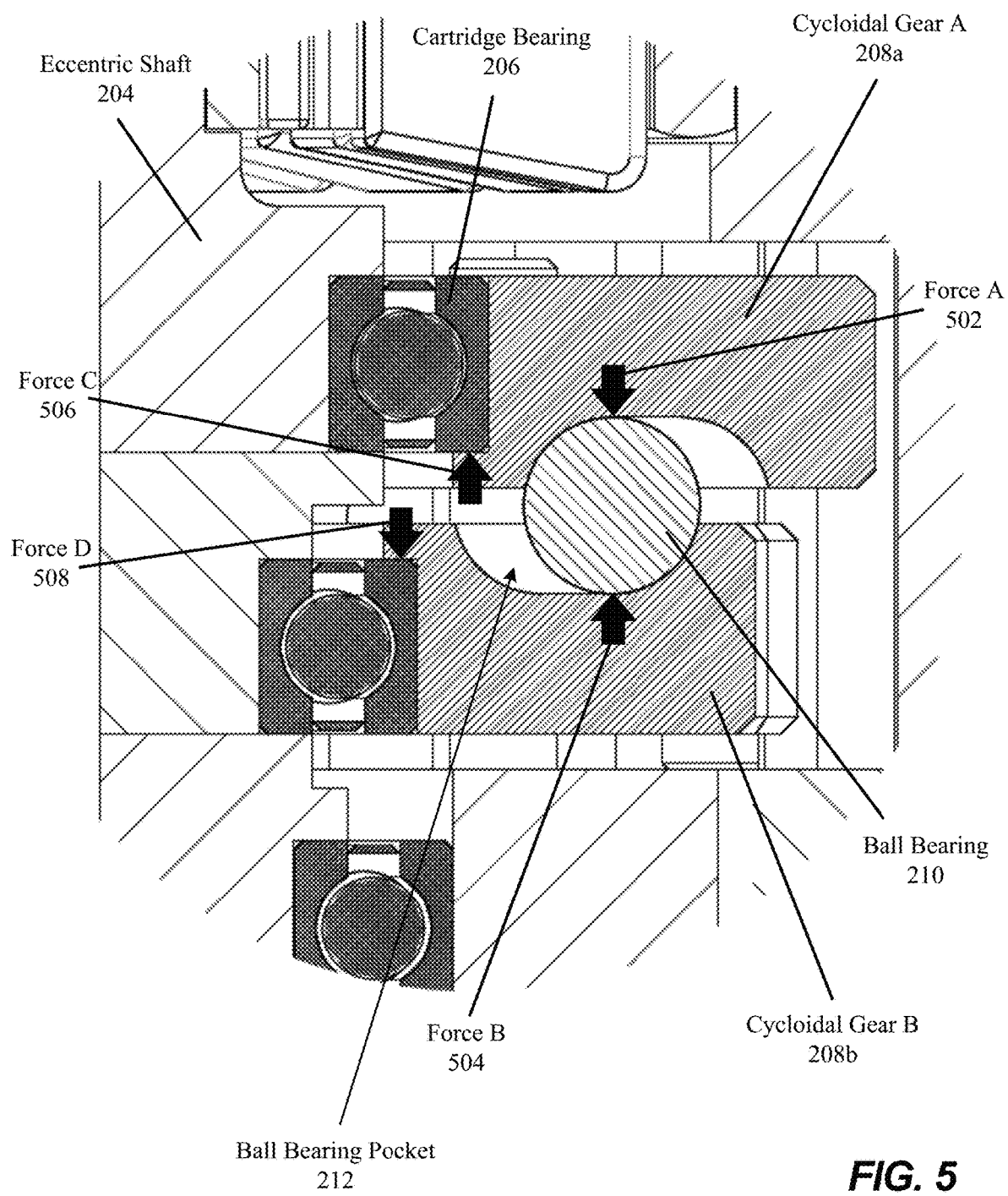
FIG. 5 illustrates an example force diagram of an example gear system.

FIG. 5 illustrates an example force diagram 500 of an example gear system 200. In particular embodiments, the force diagram 500 may be directed to the forces between both cycloidal gears 208a, 208b, ball bearing 210, cartridge bearing 206, and an eccentric shaft 204. In particular embodiments, a cycloidal gear A 208a may exert a force A 502 on the ball bearing 210. The ball bearing 210 may exert a corresponding force A 502 back to the cycloidal gear A 208a that is not shown. In particular embodiments, similarly to cycloidal gear A 208a, cycloidal gear B 208b may exert a force B 504 on the ball bearing 210. The ball bearing 210 may exert a corresponding force B 504 back to the cycloidal gear B 208b. In particular embodiments, a lip of cycloidal gear A 208a may exert a force C 506 onto the cartridge bearing 206. The cartridge bearing 206 may exert a force C 506 back to the cycloidal gear A 208a. In particular embodiments, a lip of cycloidal gear B 208b may exert a force D 508 onto a cartridge bearing 206. The cartridge bearing 206 may exert a force D 508 back to the cycloidal gear B 208b. While a number of forces are shown, there may be additional forces within the gear system 200 not shown by the force diagram 500. As an example and not by way of limitation, there may be another force that the cycloidal gears 208 exert on the cartridge bearing 206. In particular embodiments, the ball bearing 210 may prevent both cycloidal gears 208a, 208b from moving along a direction that is perpendicular to the axis of rotation. In particular embodiments, the lip of the cycloidal gears 208a, 208b may prevent the cycloidal gears 208a, 208b from moving along a vertical axis (i.e., parallel to an axis of rotation). In particular embodiments, the ball bearing 210 exerts forces A, B 502, 504 that press the cycloidal gears 208a, 208b to the cartridge bearing 206.

Figure 6A:
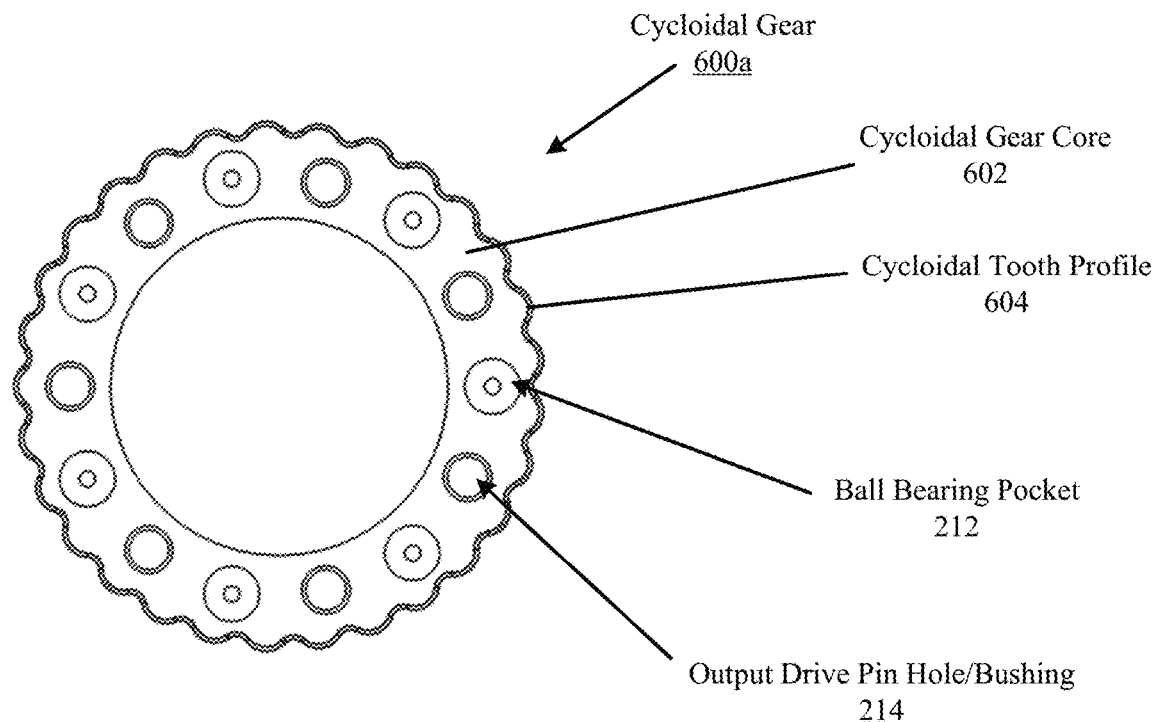
FIGS. 6A-6B illustrate example cycloidal gears.
Figure 6A:
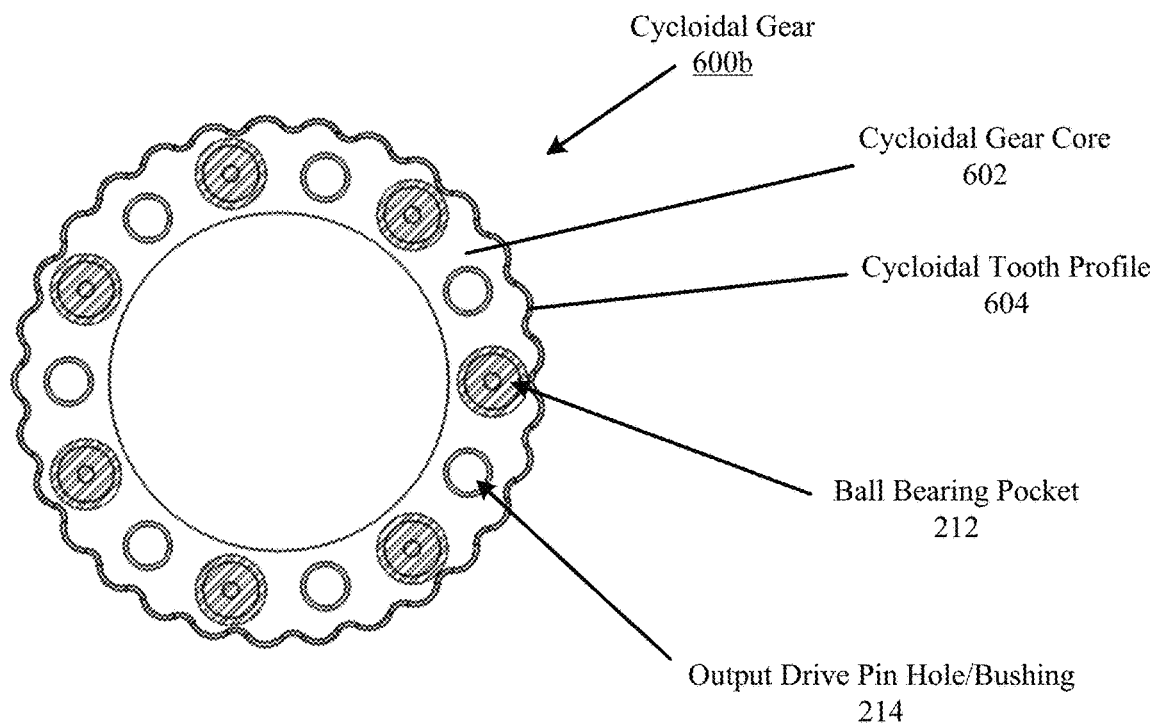
Figure 6B:
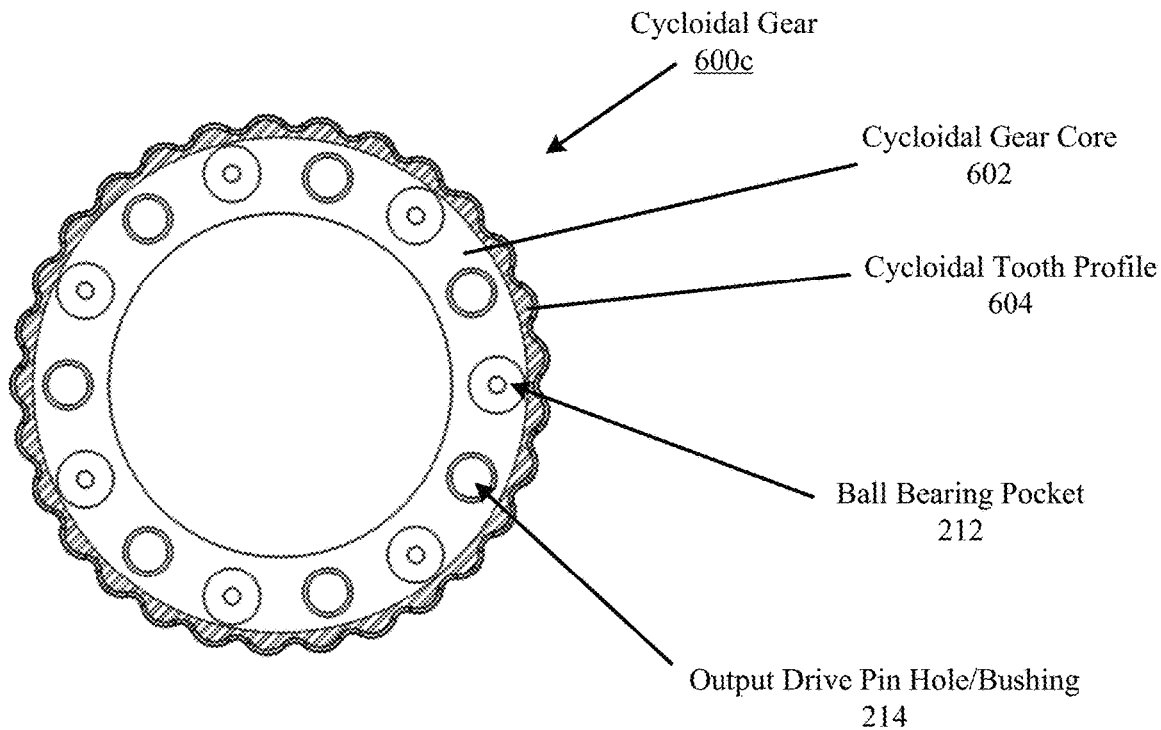
Figure 6B:
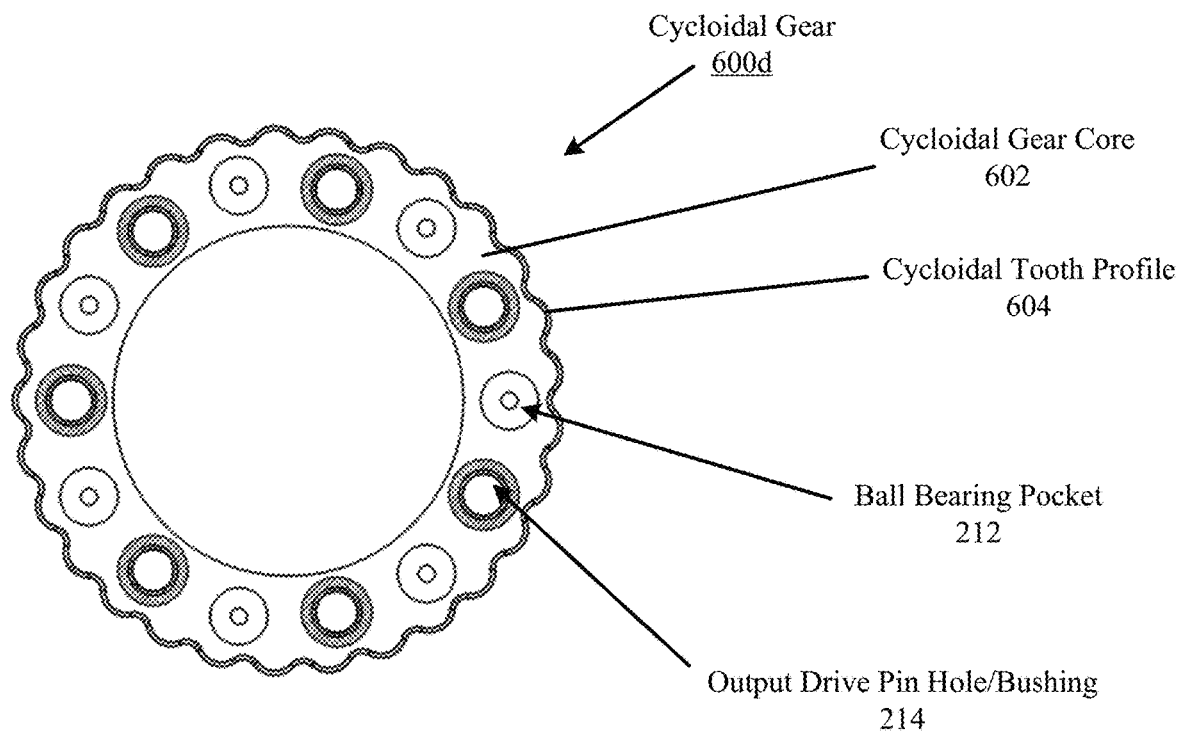

FIGS. 6A-6B illustrate example cycloidal gears 600. Each of the cycloidal gears 600 may be incorporated into an example gear system 200. In particular embodiments, each cycloidal gear shown in FIGS. 6A-6B may include a cycloidal gear core 602, cycloidal tooth profile 604, ball bearing pockets 212, and output drive pin holes/bushings 214. In particular embodiments, a cycloidal gear 600a made of standard material is shown. The standard material may be ductile steel. In particular embodiments, cycloidal gear 600b may include a cycloidal gear core 602 made of ductile steel, cycloidal tooth profile 604 made of ductile steel, output drive pin holes/bushings 214 made of ductile steel, and ball bearing pockets 212 that are made of hardened steel. In particular embodiments, cycloidal gear 600c may include a cycloidal gear core 602 made of ductile steel, ball bearing pockets 212 made of ductile steel, output drive pin holes/bushings 214 made of ductile steel, and cycloidal tooth profile 604 made of hardened steel. In particular embodiments, cycloidal gear 600d may include a cycloidal gear core 602 made of ductile steel, cycloidal tooth profile 604 made of ductile steel, ball bearing pockets 212 made of ductile steel, and output drive pin holes/bushings 214 made of bushing material. In particular embodiments, the number of output pin drive holes 214 may be equal to the number of ball bearing pockets 212. In particular embodiments, a cycloidal gear 600 may include one or more components of the example cycloidal gears 600. As an example and not by way of limitation, a cycloidal gear may include a cycloidal gear core 602 made of ductile steel, cycloidal tooth profile 604 made of hardened steel, ball bearing pockets 212 made of hardened steel, and output drive pin holes/bushings 214 made of bushing material.

Figure 7:
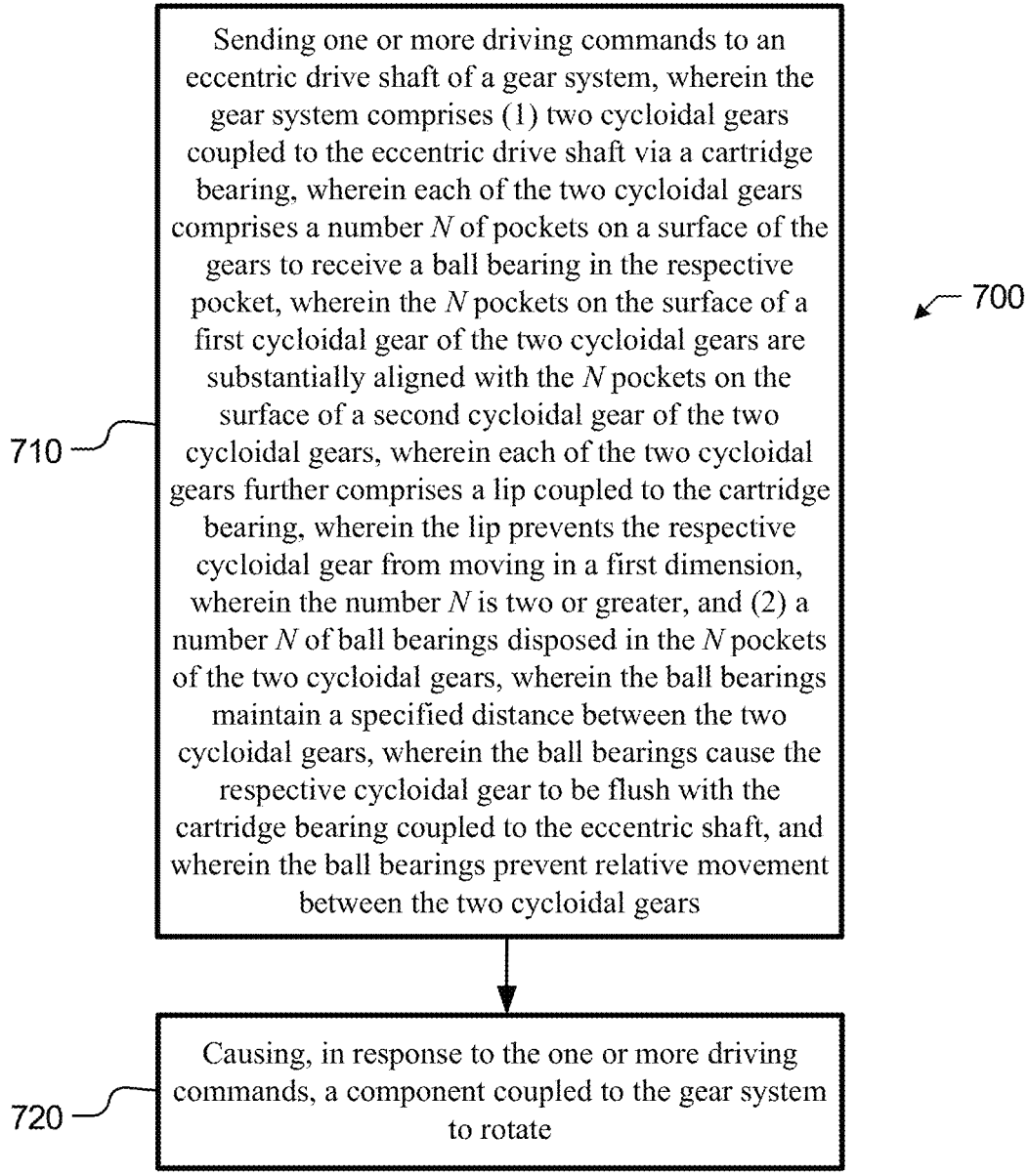
FIG. 7 illustrates an example method for implementing a gear system.

FIG. 7 illustrates is a flow diagram of a method for implementing miniaturized cycloidal gears, in accordance with the presently disclosed embodiments. The method 700 may be performed utilizing one or more processing devices (e.g., robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 700 may begin at step 710 with the one or more processing devices (e.g., robotic system 100) sending one or more driving commands to an eccentric drive shaft of a gear system. For example, in particular embodiments, the gear system may comprise two cycloidal gears coupled to the eccentric drive shaft via a cartridge bearing. In particular embodiments, each of the two cycloidal gears may comprise a number N of pockets on a surface of the gears to receive a ball bearing in the respective pocket, where the N pockets on the surface of a first cycloidal gear of the two cycloidal gears are substantially aligned with the N pockets on the surface of a second cycloidal gear of the two cycloidal gears. In particular embodiments, each of the two cycloidal gears further may comprise a lip coupled to the cartridge bearing, where the lip prevents the respective cycloidal gear from moving in a first dimension. In particular embodiments, the number N is two or greater. In particular embodiments, the gear system may comprise a number N of ball bearings disposed in the N pockets of the two cycloidal gears, where the ball bearings maintain a specified distance between the two cycloidal gears. In particular embodiments, the ball bearings may cause the respective cycloidal gear to be flush with the cartridge bearing coupled to the eccentric shaft, and where the ball bearings prevent relative movement between the two cycloidal gears. The method 700 may then continue at step 720 with the one or more processing devices (e.g., robotic system 100) causing, in response to the one or more driving commands, a component coupled to the gear system to rotate. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for implementing miniaturized cycloidal gears including the particular steps of the method of FIG. 7, this disclosure contemplates any suitable method for implementing miniaturized cycloidal gears including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
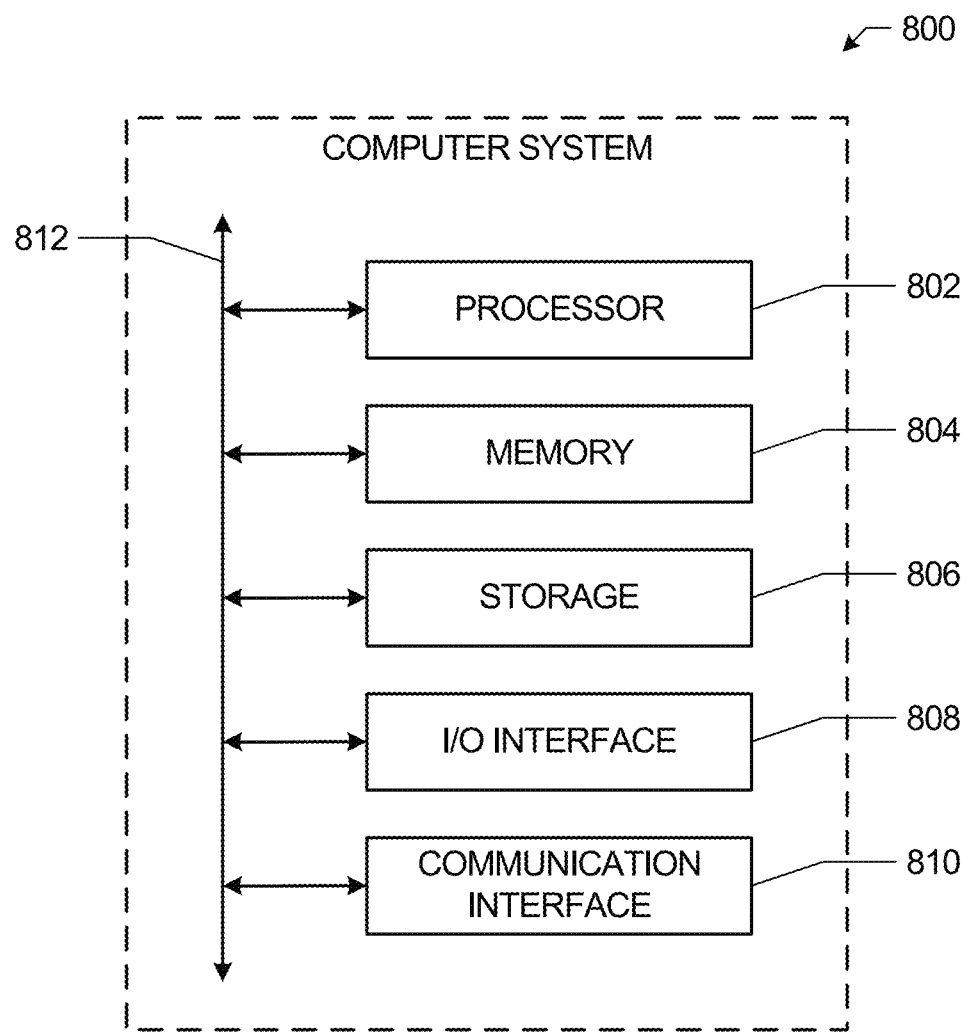
FIG. 8 illustrates an example computer system.

FIG. 8 illustrates an example computer system 800 that may be utilized in a robotic system that implements miniaturized cycloidal gears, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memory devices 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

AI Architecture

Figure 9:
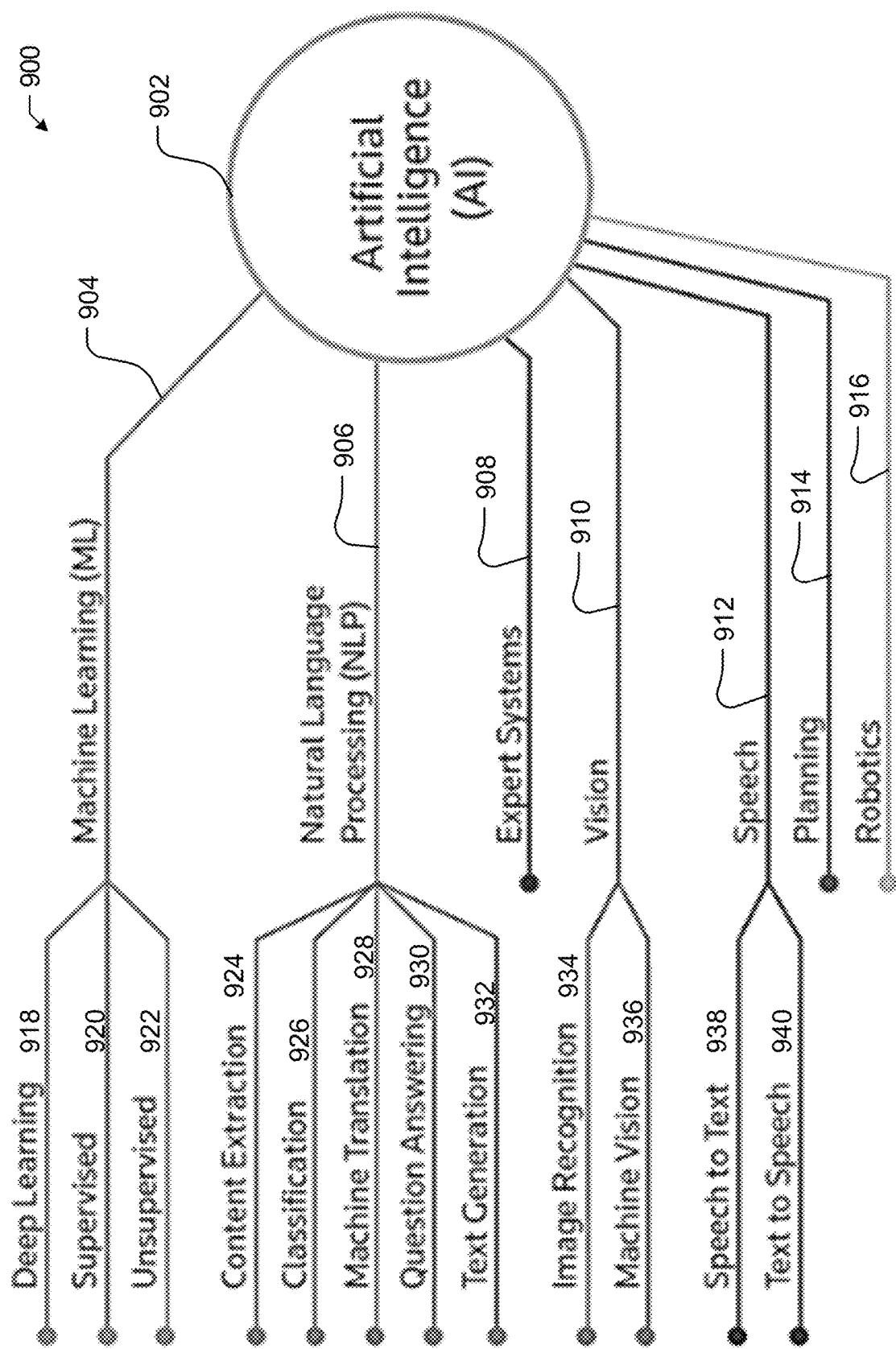
FIG. 9 illustrates a diagram of an example artificial intelligence (AI) architecture.

FIG. 9 illustrates a diagram 900 of an example artificial intelligence (AI) architecture 902 that may be utilized in a robotic system that implements miniaturized cycloidal gears, in accordance with the presently disclosed embodiments. In particular embodiments, the AI architecture 902 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 9, the AI architecture 902 may include machine leaning (ML) algorithms and functions 904, natural language processing (NLP) algorithms and functions 906, expert systems 908, computer-based vision algorithms and functions 910, speech recognition algorithms and functions 912, planning algorithms and functions 914, and robotics algorithms and functions 916. In particular embodiments, the ML algorithms and functions 904 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 904 may include deep learning algorithms 918, supervised learning algorithms 920, and unsupervised learning algorithms 922.

In particular embodiments, the deep learning algorithms 918 may include any artificial neural networks (ANNs) that may be utilized to learn deep levels of representations and abstractions from large amounts of data. For example, the deep learning algorithms 918 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 920 may include any algorithms that may be utilized to apply, for example, what has been learned in the past to new data using labeled examples for predicting future events. For example, starting from the analysis of a known training dataset, the supervised learning algorithms 920 may produce an inferred function to make predictions about the output values. The supervised learning algorithms 920 can also compare its output with the correct and intended output and find errors in order to modify the supervised learning algorithms 920 accordingly. On the other hand, the unsupervised learning algorithms 922 may include any algorithms that may applied, for example, when the data used to train the unsupervised learning algorithms 922 are neither classified or labeled. For example, the unsupervised learning algorithms 922 may study and analyze how systems may infer a function to describe a hidden structure from unlabeled data.

In particular embodiments, the NLP algorithms and functions 906 may include any algorithms or functions that may be suitable for automatically manipulating natural language, such as speech and/or text. For example, in particular embodiments, the NLP algorithms and functions 906 may include content extraction algorithms or functions 924, classification algorithms or functions 926, machine translation algorithms or functions 928, question answering (QA) algorithms or functions 930, and text generation algorithms or functions 932. In particular embodiments, the content extraction algorithms or functions 924 may include a means for extracting text or images from electronic documents (e.g., webpages, text editor documents, and so forth) to be utilized, for example, in other applications.

In particular embodiments, the classification algorithms or functions 926 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 928 may include any algorithms or functions that may be suitable for automatically converting source text in one language, for example, into text in another language. The QA algorithms or functions 930 may include any algorithms or functions that may be suitable for automatically answering questions posed by humans in, for example, a natural language, such as that performed by voice-controlled personal assistant devices. The text generation algorithms or functions 932 may include any algorithms or functions that may be suitable for automatically generating natural language texts.

In particular embodiments, the expert systems 908 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 910 may include any algorithms or functions that may be suitable for automatically extracting information from images (e.g., photo images, video images). For example, the computer-based vision algorithms and functions 910 may include image recognition algorithms 934 and machine vision algorithms 936. The image recognition algorithms 934 may include any algorithms that may be suitable for automatically identifying and/or classifying objects, places, people, and so forth that may be included in, for example, one or more image frames or other displayed data. The machine vision algorithms 936 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 912 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 938 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 940 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A gear system, comprising:
    two cycloidal gears coupled to an eccentric drive shaft via a cartridge bearing, wherein each of the two cycloidal gears comprises a number N of pockets on a surface of the gears to receive a ball bearing in the respective pocket, wherein the N pockets on the surface of a first cycloidal gear of the two cycloidal gears are substantially aligned with the N pockets on the surface of a second cycloidal gear of the two cycloidal gears, and wherein each of the two cycloidal gears further comprises a lip coupled to the cartridge bearing, wherein the lip prevents the respective cycloidal gear from moving in a first dimension, wherein the number N is three or greater;
    a number N of ball bearings disposed in the N pockets of the two cycloidal gears, wherein the ball bearings maintain a specified distance between the two cycloidal gears, wherein the ball bearings cause the respective cycloidal gear to be flush with the cartridge bearing coupled to the eccentric shaft, and wherein the ball bearings prevent relative movement between the two cycloidal gears; and
    a plurality of N drive pins, each drive pin passing through a corresponding one of a plurality of N drive-pin holes in each of the two cycloidal gears such that a radius of each drive pin lies in a plane that is parallel to a radius of that drive pin's corresponding drive-pin hole, wherein for each cycloidal gear one of the plurality of N drive-pin holes lies, in an angular direction with respect to the cycloidal gear, between each adjacent pair of N pockets on the surface of the gears.

2. The gear system of claim 1, wherein a size of each of the N pockets is based on the specified distance between the two cycloidal gears, an eccentricity of the two cycloidal gears, and the size of the ball bearings.

3. The gear system of claim 1, wherein a depth of each of the N pockets is based on a diameter of the N ball bearings and the specified distance between the two cycloidal gears.

4. The gear system of claim 3, wherein the depth of each of the N pockets is equal to the diameter of the N ball bearing minus the specified distance between the two cycloidal gears divided by two.

5. The gear system of claim 1, wherein a diameter of each of the N pockets is based on a diameter of the N ball bearings and an eccentricity of the two cycloidal gears.

6. The gear system of claim 5, wherein the diameter of each of the N pockets is equal to the diameter of the N ball bearing plus two times the eccentricity of the two cycloidal gears.

7. The gear system of claim 1, wherein an interior of each of the N pockets is curved.

8. The gear system of claim 1, wherein the ball bearings prevent the two cycloidal gears from moving a distance in a second dimension over a predetermined distance.

9. The gear system of claim 8, wherein the first dimension is parallel to the axis of rotation, and wherein the second dimension is perpendicular to the axis of rotation.

10. The gear system of claim 1, wherein the two cycloidal gears are manufactured using multi-material metal printing process.

11. The gear system of claim 10, wherein a main body of the two cycloidal gears are made of a first material comprising a first set of properties, and wherein each of the N pockets is made of a second material comprising a second set of properties that are different from the first set of properties.

12. The gear system of claim 10, wherein a main body of the two cycloidal gears are made of a ductile bulk material, and wherein each of the N pockets is made of an anti-friction material.

13. The gear system of claim 10, wherein a main body of the of the two cycloidal gears are made of a ductile bulk material, and wherein a plurality of teeth of each of the two cycloidal gears are made of a wear-resistant material.

14. A method comprising:
    sending one or more driving commands to an eccentric drive shaft of a gear system, wherein the gear system comprises:
        two cycloidal gears coupled to the eccentric drive shaft via a cartridge bearing, wherein each of the two cycloidal gears comprises a number N of pockets on a surface of the gears to receive a ball bearing in the respective pocket, wherein the N pockets on the surface of a first cycloidal gear of the two cycloidal gears are substantially aligned with the N pockets on the surface of a second cycloidal gear of the two cycloidal gears, wherein each of the two cycloidal gears further comprises a lip coupled to the cartridge bearing, wherein the lip prevents the respective cycloidal gear from moving in a first dimension, wherein the number N is two or greater, a number N of ball bearings disposed in the N pockets of the two cycloidal gears, wherein the ball bearings maintain a specified distance between the two cycloidal gears, wherein the ball bearings cause the respective cycloidal gear to be flush with the cartridge bearing coupled to the eccentric shaft, and wherein the ball bearings prevent relative movement between the two cycloidal gears;

a plurality of N drive pins, each drive pin passing through a corresponding one of a plurality of N drive-pin holes in each of the two cycloidal gears such that a radius of each drive pin lies in a plane that is parallel to a radius of that drive pin's corresponding drive-pin hole, wherein for each cycloidal gear one of the plurality of N drive-pin holes lies, in an angular direction with respect to the cycloidal gear, between each adjacent pair of N pockets on the surface of the gears; and causing, in response to the one or more driving commands, a component coupled to the gear system to rotate.

15. The method of claim 14, wherein the N ball bearings prevent the two cycloidal gears from moving in a second dimension during rotation of the eccentric drive shaft.

16. The method of claim 15, wherein the first dimension is parallel to the axis of rotation, and wherein the second dimension is perpendicular to the axis of rotation.

17. The method of claim 15, wherein the two cycloidal gears are manufactured using multi-material metal printing process.

18. The method of claim 17, wherein a main body of the two cycloidal gears are made of a first material comprising a first set of properties, and wherein each of the N pockets is made of a second material comprising a second set of properties that are different from the first set of properties.

19. The method of claim 17, wherein a main body of the two cycloidal gears are made of a ductile bulk material, and wherein each of the N pockets is made of an anti-friction material.

20. The method of claim 17, wherein a main body of the of the two cycloidal gears are made of a ductile bulk material, and wherein a plurality of teeth of each of the two cycloidal gears are made of a wear-resistant material.

* * * * *